(No Model.)
C. H. BROWN.
GALVANIC BATTERY.
No. 503,567.  Patented Aug. 15, 1893.
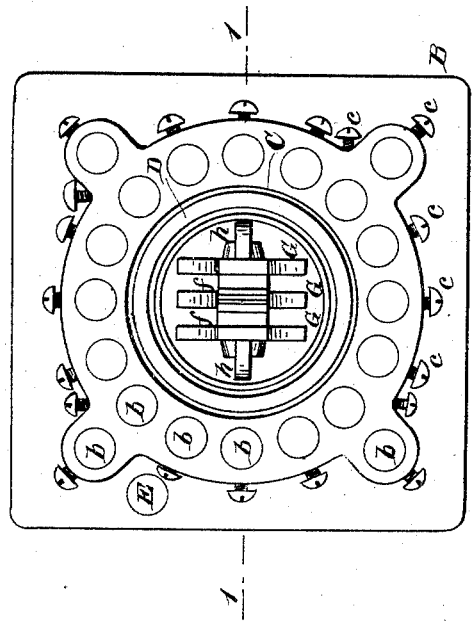
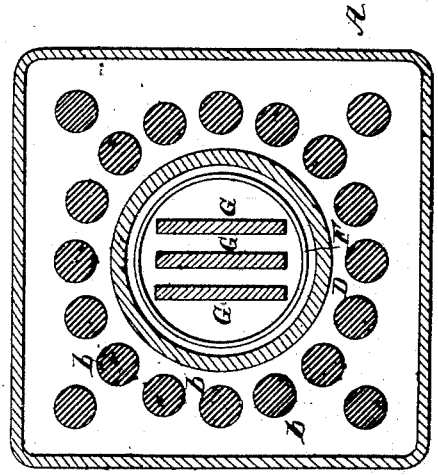
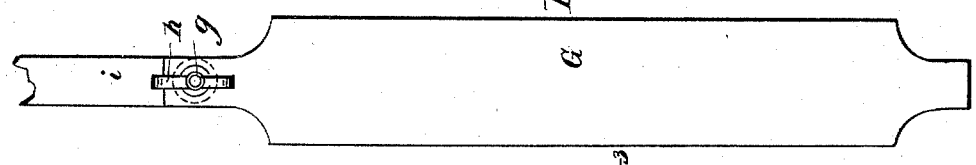
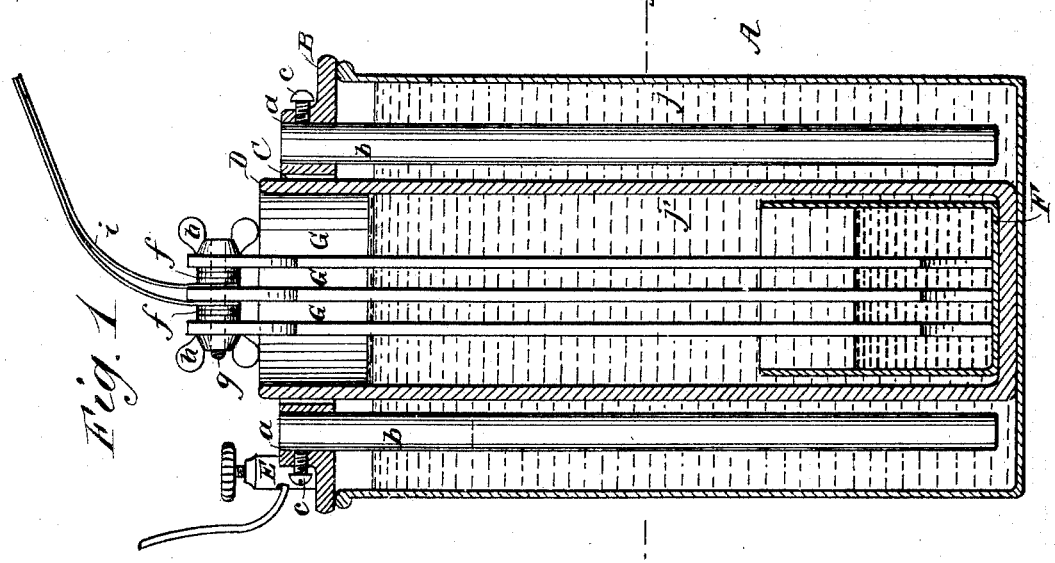
WITNESSES:
C. Neveux
C. Sedgwick
INVENTOR
C. H. Brown
BY Munn & Co
ATTORNEYS.

UNITED STATES PATENT OFFICE.

CHARLES H. BROWN, OF PORTLAND, OREGON.

GALVANIC BATTERY.

SPECIFICATION forming part of Letters Patent No. 503,567, dated August 15, 1893.

Application filed May 3, 1893. Serial No. 472,863. (No model.)

*To all whom it may concern:*

Be it known that I, CHARLES H. BROWN, of Portland, in the county of Multnomah and State of Oregon, have invented a new and Improved Galvanic Battery, of which the following is a specification, reference being had to the annexed drawings, forming a part thereof, in which—

Figure 1 is a vertical transverse section, taken on line 1—1 in Fig. 2, of my improved battery. Fig. 2 is a plan view. Fig. 3 is a transverse section taken on line 3—3 in Fig. 1; and Fig. 4 is a side elevation of the negative element.

Similar letters of reference indicate corresponding parts in all the views.

The object of my invention is to construct a simple, inexpensive and powerful battery, which may be used for either open or closed circuit work for motors, electric lighting, &c.

My invention consists in a battery provided with positive plates formed of an alloy of zinc and aluminum, as will be hereinafter more fully described.

The jar A, which contains all the working parts of the battery is formed of any suitable material, such as glass, porcelain, or enameled iron. To the top of the jar is fitted a metal plate B, provided with a central aperture C, for admitting the porous cup D, which rests upon the bottom of the jar A. The plate B is provided with a series of holes $a$, for receiving the carbon rods $b$, which are clamped in the said holes by screws $c$. The plate B is protected by a coating of pitch or other wax-like material, and is furnished with a binding post E. The porous cup D contains a vessel F, which is impervious to the solutions contained by the battery, and into which are introduced the lower ends of the positive plates G. The vessel F nearly fills the lower part of the porous cup D, and has a depth equal to about one third that of the porous cup. The positive plates G are separated by washers or distance pieces $f$, on which they are clamped by the bolt $g$, having wing nuts $h$. The conductors $i$, leading from the positive elements are apertured, received on the bolt $g$, and clamped along with the distance pieces $f$. In the space in the jar A, outside of the porous cup D, is placed the electrolyte $j$. In the vessel F, is placed mercury for the purpose of keeping up amalgamation, and above the said liquid in the porous cell, is placed the electrolyte $j'$.

The positive plates G are composed of an alloy of aluminum and zinc, preferably equal parts, the aluminum being first melted in the crucible and the zinc added, the whole being agitated until the mixture is formed.

By means of a plate formed of an aluminum alloy, great economy in the protection of the current is insured, and by employing a number of positive plates, placed near each other but not in contact, the electrolyte is economized.

Having thus described my invention, I claim as new and desire to secure by Letters Patent—

A galvanic battery, comprising a containing vessel, negative plates, and a positive plate formed of an alloy of aluminum and zinc, substantially as described.

CHARLES H. BROWN.

Witnesses:
ELLA M. SMITH,
C. W. MILLER.